United States Patent
Lu et al.

(10) Patent No.: US 10,441,945 B2
(45) Date of Patent: Oct. 15, 2019

(54) COMPOSITE MATERIAL USED FOR CATALYZING AND DEGRADING NITROGEN OXIDE AND PREPARATION METHOD AND APPLICATION THEREOF

(71) Applicant: Soochow University, Suzhou, Jiangsu (CN)

(72) Inventors: Jianmei Lu, Jiangsu (CN); Dongyun Chen, Jiangsu (CN)

(73) Assignee: SOOCHOW UNIVERSITY, Suzhou (CN)

(*) Notice: Subject to any disclaimer, the term of this patent is extended or adjusted under 35 U.S.C. 154(b) by 328 days.

(21) Appl. No.: 15/382,630

(22) Filed: Dec. 17, 2016

(65) Prior Publication Data
US 2017/0173571 A1    Jun. 22, 2017

(30) Foreign Application Priority Data

Dec. 17, 2015 (CN) .......................... 2015 1 0955976

(51) Int. Cl.
*B01J 21/18* (2006.01)
*B01J 31/06* (2006.01)
(Continued)

(52) U.S. Cl.
CPC ........ *B01J 31/069* (2013.01); *B01D 53/8628* (2013.01); *B01J 19/127* (2013.01);
(Continued)

(58) Field of Classification Search
CPC .......... B01J 19/10; B01J 27/24; B01J 31/069; B01D 2255/702; B01D 2259/816; C01B 21/0605
See application file for complete search history.

(56) References Cited

U.S. PATENT DOCUMENTS 10,232,347 B2 * 3/2019 Lu ........................ B01J 21/185
2010/0000441 A1 * 1/2010 Jang ..................... C09D 11/037
106/31.13
(Continued)

FOREIGN PATENT DOCUMENTS

CN         103011099 A  *  4/2013
CN         103769187 A  *  5/2014
(Continued)

OTHER PUBLICATIONS

Duan et al., (Porous C3N4 Nanolayers@N-Graphene Films as Catalyst Electrodes for Highly Efficient Hydrogen Evolution, ACS Nano 2015, 9 (1), p. 931-940).*
(Continued)

*Primary Examiner* — Jun Li
(74) *Attorney, Agent, or Firm* — SZDC Law P.C.

(57) ABSTRACT

The invention discloses a composite material used for catalyzing and degrading nitrogen oxide and its preparation method and application thereof. The invention of the hollow g-$C_3N_4$ nanospheres/reduced graphene oxide composite-polymer carbonized nanofiber material is prepared as follow: 1) the preparation of silica nanospheres; 2) the preparation of hollow g-$C_3N_4$ nanospheres; 3) the preparation of graphene oxide; 4) the preparation of surface modified hollow g-$C_3N_4$ nanoparticles preparation; 5) the preparation of composites; 6) the preparation of composite-polymer carbon nanofiber material. The raw materials used in the process is low cost and easy to get; the operation of the invention is simple and convenient without the use of expensive equipment in the whole process; the composite has high adsorption efficiency of ppb level nitrogen oxide with good repeatability.

7 Claims, 4 Drawing Sheets

(51) Int. Cl.
| | |
|---|---|
| *B01J 35/06* | (2006.01) |
| *B01J 37/08* | (2006.01) |
| *B01D 53/86* | (2006.01) |
| *B01J 19/12* | (2006.01) |
| *C01B 21/06* | (2006.01) |
| *B01J 27/24* | (2006.01) |
| *B01J 35/00* | (2006.01) |
| *B01J 35/08* | (2006.01) |
| *B01J 37/00* | (2006.01) |
| *B01J 37/02* | (2006.01) |
| *B01J 37/04* | (2006.01) |

(52) U.S. Cl.
CPC .............. *B01J 21/18* (2013.01); *B01J 27/24* (2013.01); *B01J 35/004* (2013.01); *B01J 35/0006* (2013.01); *B01J 35/06* (2013.01); *B01J 35/08* (2013.01); *B01J 37/0018* (2013.01); *B01J 37/0072* (2013.01); *B01J 37/0221* (2013.01); *B01J 37/04* (2013.01); *B01J 37/084* (2013.01); *C01B 21/0605* (2013.01); *B01D 2255/70* (2013.01); *B01D 2255/702* (2013.01); *B01D 2255/802* (2013.01); *B01D 2257/404* (2013.01); *B01D 2259/802* (2013.01); *B01J 2231/005* (2013.01); *B01J 2531/002* (2013.01); *B01J 2531/008* (2013.01)

(56) References Cited

U.S. PATENT DOCUMENTS

| | | | | |
|---|---|---|---|---|
| 2011/0070138 | A1* | 3/2011 | Menini | C04B 20/1059 423/239.1 |
| 2014/0113086 | A1* | 4/2014 | Greenhill | F41H 1/04 428/34.1 |
| 2014/0154941 | A1* | 6/2014 | Zhamu | H01B 1/04 442/136 |
| 2014/0308449 | A1* | 10/2014 | Zhamu | D01D 1/02 427/372.2 |
| 2015/0099214 | A1* | 4/2015 | Khe | H01B 1/24 429/523 |
| 2017/0113934 | A1* | 4/2017 | Kowalewski | C01B 32/184 |
| 2017/0197828 | A1* | 7/2017 | Yoon | B01D 5/00 |

FOREIGN PATENT DOCUMENTS

| | | | |
|---|---|---|---|
| CN | 104399510 A | * | 3/2015 |
| CN | 104649260 A | * | 5/2015 |
| KR | 20130134797 A | * | 12/2013 |

OTHER PUBLICATIONS

Wu et al., (Graphitic carbon nitride nanosheet electrode-based high-performance ionic actuator,Nature Communications ,I2015, vol. 6: 7258, pp. 1-8).*

Kim et al., (Graphene/Polymer Nanocomposites, Macromolecules, 2010, 43 (16), pp. 6515-6530).*

Pawar et al., (Graphene oxide—Polyvinyl alcohol nanocomposite based electrode material for supercapacitors, Journal of Power Sources, vol. 321, Jul. 30, 2016, pp. 102-105).*

Zhao et al. (Graphitic carbon nitride based nanocomposites: a review , Nanoscale, 2015, 7, 15-37).*

Li et al. (Cross-Linked g-C3N4/rGO Nanocomposites with Tunable Band Structure and Enhanced Visible Light Photocatalytic Activity, 2013, 9 (19) pp. 3336-3344).*

Zhu et al. (Graphitic Carbon Nitride: Synthesis, Properties, and Applications in Catalysis, ACS Appl. Mater. Interfaces, 2014, 6 (19), pp. 16449-16465).*

Anbia et al. (Stepwise Synthesis of Mesoporous Carbon Nitride Functionalized by Melamine Based Dendrimer Amines for Adsorption of CO2 and CH4, Journal of Ultrafine Grained and Nanostructured Materials, vol. 49, No. 2, Dec. 2016, pp. 64-71).*

Wang (Polymeric Graphitic Carbon Nitride for Heterrogenous Photocatalysis, ACS Catak., 2012, 2, p. 1596-1606).*

* cited by examiner

US 10,441,945 B2

COMPOSITE MATERIAL USED FOR CATALYZING AND DEGRADING NITROGEN OXIDE AND PREPARATION METHOD AND APPLICATION THEREOF

This application claims priority to Chinese Patent Application No: 201510955976.9, filed Dec. 17, 2015, which is incorporated by reference for all purposes as if fully set forth herein.

TECHNICAL FIELD

The invention belongs to the technical field of functional materials which related to a composite material for catalytic degradation of nitrogen oxides. In detail, it relates to a hollow graphite phase carbon nitride nanosphere/reduction-oxidation graphene composite and polymer carbide nano fiber material, its preparation method and application in catalytic degradation of nitrogen oxide.

BACKGROUND TECHNOLOGY

Nitrogen oxide have great harm to the ecological environment and human health as main components of pollutants in the air. It is an effective method to reduce the concentration of nitrogen oxides in the air through the photocatalytic activity of the photocatalyst.

As a new type semiconductor photocatalyst with visible light response, graphite carbon nitride (g-$C_3N_4$) has many advantages, such as excellent physical and chemical stability, medium band gap (2.7 eV), stable electronic structure. These characteristics make it become a candidate as the visible light photocatalytic utilizing solar energy. In addition, g-$C_3N_4$ is rich in content and easy to make. It can be obtained using the cheap precursor (such as melamine, melamine, urea, thiourea, dicyandiamide) by one-step polymerization. However, due to fast photoinduced electron-hole pairs recombination, smaller surface area, low visible light utilization efficiency, pure g-$C_3N_4$ have much limit in the application in the photocatalysis field.

SUMMARY OF THE INVENTION

In view of the above situation, the invention improves the properties of photocatalytic through the regulation of g-$C_3N_4$ micro-structure and method for connecting with other materials. Hollow spherical morphology of g-$C_3N_4$ can optimize the absorption and distribution of visible light, thus improving the photocatalytic efficiency. In addition, the graphene with planar two-dimensional material has good conductivity, the composite with g-$C_3N_4$ can promote charge transfer and separation in the photocatalytic process. In practical application, the photocatalyst usually requires a suitable carrier. The polymer nanofibers prepared by electrospinning can fix the nanoparticles effectively. Therefore, the invention prepared composite materials for catalytic oxidation of nitrogen oxides (especially nitric oxide) using composite hollow g-C3N4 nanospheres and reduction of graphene oxide as photocatalyst and polymer nanofibers as carrier.

In order to realize the above purpose, the invention adopts the following technical scheme:

A method for preparing hollow g-$C_3N_4$ nanosphere/reduced graphene oxide composite-polymer carbon nanofiber material is prepared. The method comprises the following steps:

(1) Preparation of Silica Nano Spheres (SNS):

In accordance with mass ratio of concentrated ammonia:ethanol:water:ethyl silicate=1:15~20:1~5:1~2, ethyl silicate (TEOS) was added to the concentrated ammonia mixture of ethanol and water. After mixing static 1~2 hours, adding the mixture of ethyl silicate and mass octadecyltrimethoxysilane ($C_{18}$TMOS) with mass ratio of 1:1-2. After mixing evenly 3~5 hours, the mixture was centrifugated, dried and calcined 6~8 hours at 550~570° C., and then washed with 1M hydrochloric acid and dried. Then the silica nanosphere was got.

(2) Preparation of Hollow g-$C_3N_4$ Nanospheres (HCNS):

Under vacuum conditions, the silica nanospheres as the template in the step (1) and cyanamide was mixed with the mass ratio of 1:3~7 and stirred for 3~5 hours, ultrasonic treatment for 2~3 hours, and then reacted at 60~70° C. for 10~12 hours. The obtained powder by centrifugation was heated to 550~570° C. under inert gas atmosphere and calcined for 4~5 hours. Then 4M ammonium acid fluoride ($NH_4HF_2$) was used to etch silica nanospheres template in the powder. After centrifuging, washing and drying, HCNS was obtained.

(3) Preparation of Graphene Oxide (GO):

In an ice water bath and stirring conditions, graphite was added to concentrated sulfuric acid with the proportion of graphite: concentrated sulfuric acid=1 g: 20~25 mL. After mixing evenly, potassium hypermanganate was added to the above mixture with mass ratio of graphite: potassium hypermanganate=1:5~8 at 35~40° C. and react for 12 h. After the reaction, the system will be poured into ice water containing hydrogen peroxide. After centrifugation, washing and drying, graphene oxide was obtained.

(4) Preparation of Surface Modified Hollow g-$C_3N_4$ Nanospheres (MHCNS):

In an inert gas atmosphere, 3-aminopropyltriethoxysilane (KH550) was added to HCNS dispersed in methylbenzene with the proportion of HCNS: KH550=1 g: 3~5 mL. After refluxing for 20~24 hours, surface modification of hollow g-$C_3N_4$ nanospheres was obtained by centrifugation, washing and drying.

(5) Preparation of Hollow g-$C_3N_4$ Nanosphere/Reduced Graphene Oxide Composite (HCNS/rGO):

Graphene oxide aqueous solution was added to MHCNS in step (4) dispersed in water whose pH is 10 with the mass ratio of MHCNS:rGO=1:0.1~0.3. The mixture was stirred at room temperature for 1~2 hours. Then hydrazine was poured into the above mixture with mass ratio of rGO: hydrazine=1: 1~2 at 95° C. After reacted for 1~2 hours, HCNS/rGO composite was obtained by centrifugation, washing and drying.

(6) Preparation of Carbonized Composite Polymer Nanofiber Material (CCPF):

The composite obtained in step (5) was added to DMF solution of the polymer with mass ratio of composite: polymer=1:15~20 ratio. The above mixture was stirred at room temperature for 5~8 hours, and the nanofiber was prepared by electrostatic spinning. The nanofiber was heated to 500~520° C. under inert gas atmosphere and calcined for 4~5 hours. Then CCPF was obtained.

Preferably, in the preparation method, the mass ratio of concentrated ammonia, ethanol, water, and ethyl silicate in the process (1) are 1:18.7:3.2:1.8.

Preferably, in the process of preparation, the mass percentage of ammonia in the concentrated ammonia liquor in the step (1) is 22%~25%.

Preferably, in the method of preparation, the mass ratio of the ethyl silicate and the mixed liquid of ethyl silicate and octadecyltrimethoxysilane in the step (1) is 1:1.5.

Preferably, in the process of preparation, the mass ratio of the ethyl silicate and octadecyltrimethoxysilane in mixed liquid of ethyl silicate and octadecyltrimethoxysilane in the step (1) is 1:0.45.

Preferably, in the process of preparation, the mass ratio of silica nanospheres and melamine in the step (2) is 1:5.

Preferably, in the process of preparation, the ratio of graphite and concentrated sulfuric acid in the step (3) is 1 g:23 mL.

Preferably, in the process of preparation, the mass ratio of graphite and Potassium Permanganate in the step (3) are 1:6.

Preferably, in the method of preparation, the Potassium Permanganate is divided into two batches with the same quality in the step (3).

Preferably, in the process of preparation, the ratio of the hollow graphitic carbon nitride nanospheres and 3-aminopropyltriethoxysilane in the step (4) is 1 g:3 mL.

Preferably, in the preparation method, the concentration of the hollow graphite phase carbon nitride nanosphere in the suspension of the step (4) is 1 mg/mL.

Preferably, in the preparation method, the mass ratio of the surface modified HCNS and the graphene oxide in the step (5) is 1:0.1.

Preferably, in the process of preparation, the concentration of the surface modified HCNS in the suspension in the step (5) is 1 mg/mL.

Preferably, in the process of preparation, the concentration of graphene oxide in the aqueous solution in the step (5) is 0.1 mg/mL.

Preferably, in the process of preparation, the mass ratio of the graphene oxide and the hydrazine hydrate in the step (5) is 1:1.

Preferably, in the process of preparation, the mass ratio of the composite and the polymer in the step (6) is 1:20.

Preferably, in the process of preparation, the polymer is selected from the group consisting of PAN, polyvinyl alcohol and polyvinyl. The best one is PAN.

Preferably, in the process of preparation, the mass percentage of the polymer DMF solution in the process (6) is 10%.

Preferably, in the preparation method, the condition of the electrostatic spinning in the step (6) is as follows: negative pressure −9 kV, positive pressure 18 kV, pushing speed 0.2 mm/min.

Preferably, the inert gas is selected from the group consisting of nitrogen, helium, argon. The best one is argon.

Hollow $g-C_3N_4$ nanospheres/reduced graphene oxide-carbonized polymer nanofiber material prepared by the preparation method.

The application of the above hollow $g-C_3N_4$ nanospheres/reduced graphene oxide-carbonized polymer nanofiber material in the catalytic degradation of nitrogen oxides (especially nitric oxide).

Compared with the prior technology, the invention utilizing the above method has the following advantages:

(1) the cost of raw materials used in the preparation process is cheap and easy to obtain;

(2) the operation is simple and convenient, and the whole process does not use expensive equipment;

(3) the product has high adsorption efficiency and good repeatability to the ppb level of nitrogen oxides.

IMPLEMENTATION EXAMPLES

Figure 1:
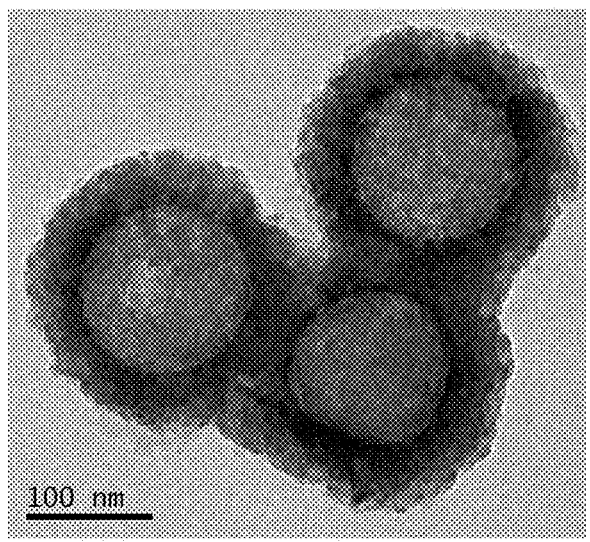
FIG. 1 is the transmission electron microscope (TEM) for the hollow $g-C_3N_4$ nanospheres (HCNS).

The examples and figures will be combined below to illustrate the technical scheme of the invention. Unless otherwise stated, the following materials and reagents can be obtained through commercial means.

Example 1

The Preparation of SNS

22% ammonia (1.55 g), ethanol (29 g) and deionized water (5 g) was mixed, then TEOS (2.8 g) was added to the mixture and keep static for 1 h. The mixture of the above system was added with TEOS and $C_{18}TMOS$ (a total of 4.22 g, including 2.91 g TEOS and 1.31 g $C_{18}TMOS$) and keep static for 3 h. The system was centrifugated (5000 rpm*5 min) to obtain solid followed by drying and been calcined at 550° C. for 6 h. Then the solid was washed by 1M hydrochloric acid and drying to obtain SNS (1.8 g).

Example 2

The Preparation of HCNS

Under vacuum conditions, the template SNS (1 g) in example1 and melamine (5 g) was mixed and stirred for 3 hours and then ultrasonic treatment for 2 hours followed by reacting for 12 hours at 60° C.The above reaction system was centrifugated to obtain white solid. Under Ar atmosphere, the solid is heated to 550° C. at the heating rate of 4.4° C./min for 4 hours. After calcining for 4 hours yellow powder was obtained, and then 4M $NH_4HF_2$ was used to etch silica nanosphere template. HCNS was obtained after centrifugating, washing 3 times, ethanol washing 1 time and drying at 80° C. in vacuum.

FIG. 1 is the TEM for HCNS, it can be seen that HCNS has a hollow spherical structure.

Example 3

The Preparation of GO

The graphite (3 g) is added to concentrated sulfuric acid (69 mL) in the ice water bath under magnetic stirring for 2 h. After mixing evenly, half dose of Potassium Permanganate (9 g) was added to the mixture with the system temperature lower than 20° C. Then the reaction system was heating to 35° C. and stirring for 7 h. The rest of the Potassium Permanganate (9.0 g) was once added to the reaction system and stirring for 12 h. The mixture is poured into the 400 mL ice water, then 3 mL hydrogen peroxide was added to the mixture to get yellow mixture. After centrifugation and followed by washing with 5% hydrochloric acid and deionized water for 3 times and drying in vacuum drying box for 12 h, GO (1.4 g) was obtained.

Example 4

The Preparation of MHCNS

In Ar atmosphere, HCNS (0.5 g) in example 2 was dispersed in toluene (500 mL). KH550 (1.5 mL) was added to the system and refluxing for 24 h. MHCNS (0.53 g) was obtained by centrifugation and washed by ethanol and water 2 times and dried at 80° C. for 12 h.

Examples 5

The Preparation of HCNS/rGO

The surface modified HCNS (100 mg) obtained in example 4 was dispersed in water with ammonia (100 mL) whose pH value is adjusted to 10. Concentration of GO aqueous solution of 0.1 mg/mL (100 mL) was added to the above mixture with stirring at room temperature for 1 h. Then add hydrazine hydrate (10 mg) to the system at 95° C. and react for 1 H to reduce GO to rGO. After centrifugation, washing 3 times and drying at the temperature of 80° C. for 12 h, HCNS/rGO (102 mg) was obtained.

Figure 2:
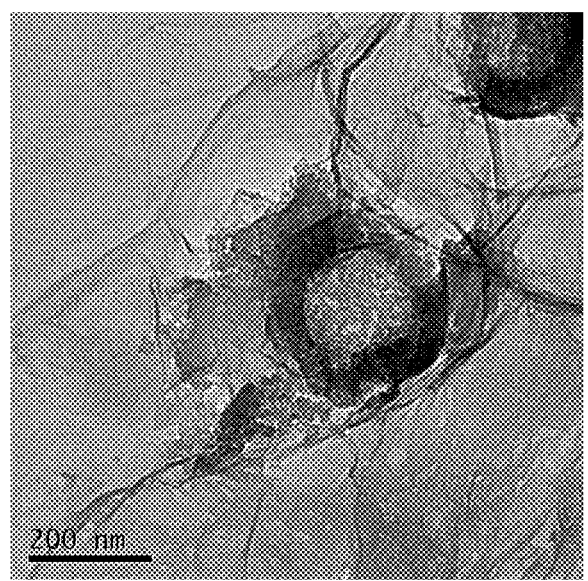
FIG. 2 is the TEM for hollow $g-C_3N_4$ nanospheres/reduced graphene oxide composites (HCNS/rGO).
Figure 3:
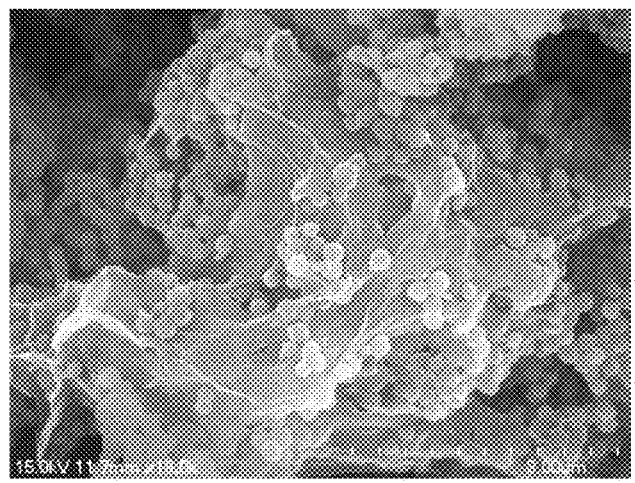
FIG. 3 is the scanning electron microscope (SEM) for the hollow $g-C_3N_4$ nanospheres/reduction graphene oxide composites (HCNS/rGO).

FIG. 2 is the TEM of HCNS/rGO. FIG. 3 is the SEM of HCNS/rGO. Through two figures it can be seen that rGO completely wrapped HCNS, the composite of the two compounds was prepared successfully.

Examples 6

The Preparation of: CCPF

The polyacrylonitrile (2 g) was dissolved in DMF (18 G) with stirring for 3 h to get homogeneous solution. HCNS/rGO (100 mg) was dispersed in the solution with stirring at room temperature for 5 h and then treated by ultrasonic for 2 min. The solution was drawn by 5 mL syringe, The nanofiber was obtained by electrospinning under the condition of the negative pressure −9 kV, pressure 18 kV, speed 0.2 mm/min. In Ar atmosphere, the nanofibers was heating to 500° C. at heating rate of 2° C./min and calcined for 4 h to get final product CCPF.

Figure 4:
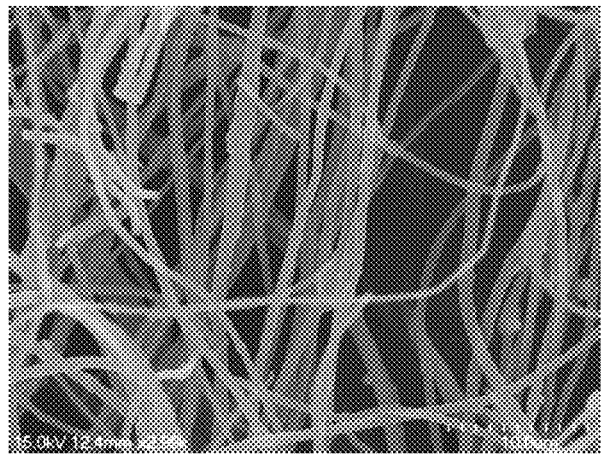
FIG. 4 is the SEM for the carbonized composite-polymer nanofiber material (CCPF).
Figure 5:
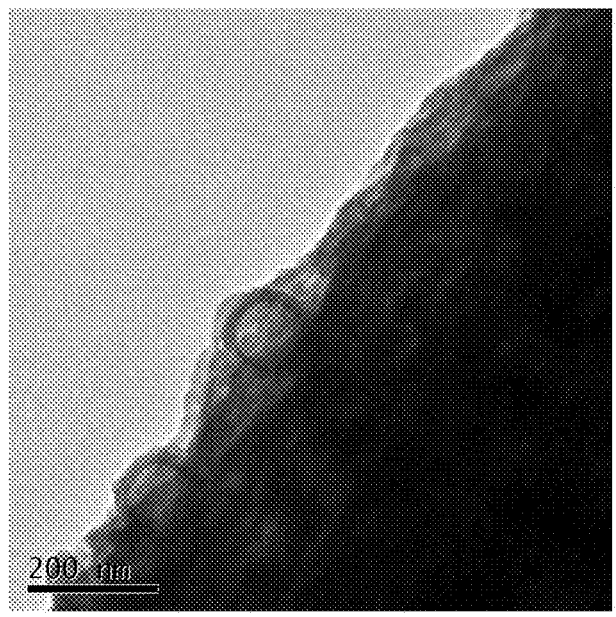
FIG. 5 is the TEM for the carbonized composite-polymer carbon nanofiber material (CCPF).
Figure 6:
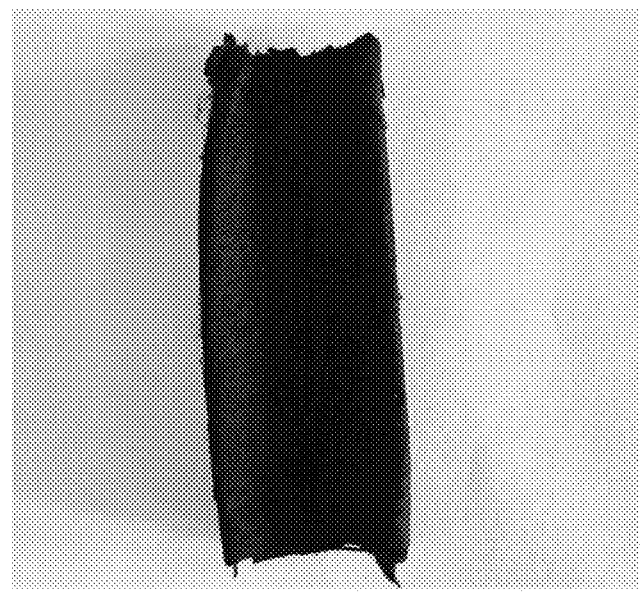
FIG. 6 is a photo for the carbonized composite-polymer nanofiber material (CCPF).

FIG. 4 is the SEM of CCPF, it can be seen that CCPF is threadiness, with the diameter of about 1 μm. FIG. 5 is the TEM of CCPF, it can be seen that there is HCNS on the surface, showed that HCNS was successfully loaded on CCPF. FIG. 6 is the photograph of CCPF, it can be seen that the final product CCPF is a film, which is not the same as the HCNS/rGO powder, and more convenient for application.

Example 7

NO degradation Test Under Visible Light Condition

The prepared CCPF and other catalysts were put in 1.6 L (Φ10×20 cm) cylindrical glass container. 100 ppm NO (N2 for gas balance) was diluted to 600 ppb by air. The dilution gas was humidified to 50% by humidifying chamber. The mixed gas was adjusted to the flow of 2.4 L/min. After achieving gas balance in the container, open energy the lamp (20 W). 42i-HL (Thermo Environmental Instruments nitrogen oxides analyzer, Inc.) was used to monitor real-time concentration. The flow gas passing the analyzer is 1 L/min. NO degradation efficiency (η) was calculated by the equation: $\eta(\%)=(1-C/C_0)\times 100\%$, C and $C_0$ represent the concentration of NO in export and entrance, respectively.

Figure 7:
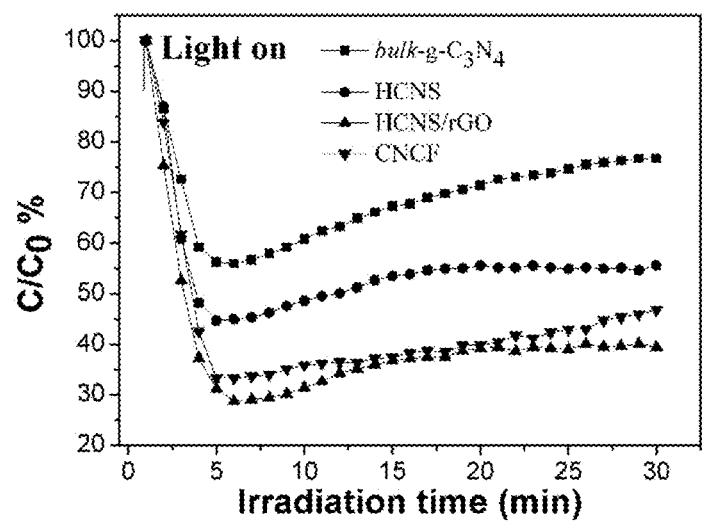
FIG. 7 shows the catalytic effect of the carbonized composite-polymer nanofiber material (CCPF) and several kinds of photocatalyst on NO.

FIG. 7 shows the catalytic effect of CCPF and several kinds of photocatalyst for NO, it can be seen from the figure that catalytic efficiency of bulk $g-C_3N_4$, HCNS, HCNS/rGO and CCPF were 25%, 47%, 64% and 60%. Compared to $g-C_3N_4$ and HCNS, the catalytic efficiency of HCNS/rGO has improved significantly, implying that through the regulation of micro structure and connection with other material, the catalytic efficiency of $g-C_3N_4$ can be effectively improved. The catalytic efficiency of CCPF and HCNS/rGO is roughly the same, which proves that it is appropriate to use carbon nanofiber to load HCNS/rGO.

Figure 8:
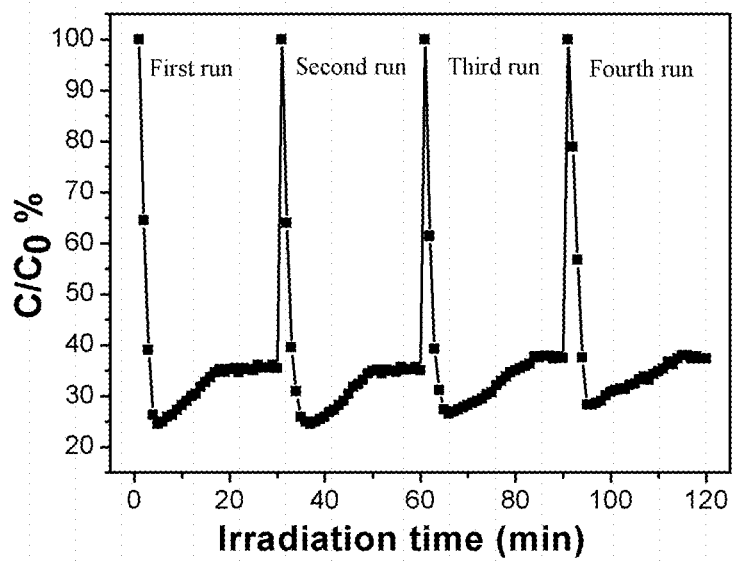
FIG. 8 shows he catalytic cycle of polymer composites (CCPF) on NO.

FIG. 8 shows cycle adsorption effect for NO of CCPF. We can see that, after four times of adsorption, CCPF still maintain a high catalytic efficiency, indicating that CCPF has a good practicality.

The above analysis shows that through controlling the microstructure and combining with other materials to form heterojunction, the ability of $g-C_3N_4$ to NO adsorption and catalysis can be improved. The carbonized nanofiber can load photocatalyst, which is convenient in practical application. The photocatalytic material is capable of absorbing and catalyzing low concentration of NO with the advantage of high catalytic efficiency, recycling and cheap material. Therefore, it has a very good prospect in the future of air purification.

The invention claimed is:
1. A preparation method of a hollow graphitic carbon nitride nanosphere/graphene composite and composite-carbonized polymer nano fiber material, comprising the following steps:
  (1) preparation of silica nanospheres:
    adding ethyl silicate into a mixture of ammonia, ethanol and water having a mass ratio of ammonia: ethanol: water: ethyl silicate=1:15~20:1~5:1~2, the formed mixture standing for 1~2 hours, adding a mixture of ethyl silicate and octadecyltrimethoxysilane having a mass ratio of ethyl silicate: octadecyltrimethoxysilane=1:1-2 to previously formed the mixture, mixing evenly and standing for 3~5 hours, a resulted mixture being centrifugated, dried and calcined for 6~8 hours at 55~570° C., and then washed with 1M hydrochloric acid and dried, to obtain the silica nanospheres,
  (2) preparation of hollow graphitic carbon nitride nanospheres:
    using the silica nanospheres in the step (1) as a template and mixing with cyanamide in a mass ratio of 1:3~7 and stirring for 3~5 hours under vacuum, ultrasonic treating for 2~3 hours, and then reacting at 60~70° C. for 10~12 hours and obtaining a solid by centrifugation, the obtained solid being heated to 55~570° C. under inert gas atmosphere and calcined for 4~5 hours producing a powder, then using 4M ammonium acid fluoride to etch the silica nanospheres template in the powder, after centrifuging, washing and drying, obtaining the hollow graphitic carbon nitride nanospheres,
  (3) preparation of graphene oxide:
    adding graphite to concentrated sulfuric acid in a ratio of graphite: concentrated sulfuric acid=1g: 20~25mL with stirring in an ice water bath, after mixing evenly, adding potassium hypermanganate to the mixture of graphite and concentrated sulfuric acid in a mass ratio of graph- ite: potassium hypermanganate=1:5~8, reacting at 35~40° C. for 12h pouring the mixture of graphite, concentrated sulfuric acid, and potassium hypermanganate into ice water containing hydrogen peroxide, after centrifugation, washing and drying, obtaining the graphene oxide, (4) preparation of surface modified hollow graphitic carbon nitride nanospheres:

adding 3-aminopropyltriethoxysilane to a suspension of the hollow graphitic carbon nitride nanospheres in methylbenzene in a mass ratio of the hollow graphitic carbon nitride nanospheres: 3-aminopropyltriethoxysilane=1g: 3~5mL, after refluxing for 20~24 hours, centrifuging, washing and drying, obtaining the surface modified hollow graphitic carbon nitride nanospheres, (5) preparation of hollow graphitic carbon nitride nanospheres/graphene composite:

adding graphene oxide aqueous solution to the surface modified hollow graphitic carbon nitride nanospheres in step (4) dispersed in water with a pH value of 10 in a mass ratio of the surface modified hollow graphitic carbon nitride nanospheres: graphene oxide=1:0.1~0.3, stirring the mixture of the surface modified hollow graphitic carbon nitride nanospheres and the graphene oxide at room temperature for 1~2 hours, adding hydrazine hydrate into the mixture in a mass ratio of graphene oxide: hydrazine hydrate=1:1~2, reacting for 1~2 hours at 95° C., centrifuging, washing and drying, obtaining the hollow graphitic carbon nitride nanospheres/graphene composite, (6) preparation of composite-carbonized polymer nanofiber material:

adding the composite obtained in step (5) to a DMF solution of a polymer with a mass ratio of composite: polymer=1:15~20, stirring the mixture of the composite and polymer at room temperature for 5~8 hours, preparing a nanofiber through electrostatic spinning, the nanofiber being heated to 500~520° C. under inert gas atmosphere and calcined for 4~5 hours, obtaining the composite-carbonized polymer nanofiber material.

2. The preparation method according to claim 1, wherein:
the mass ratio of ammonia, ethanol, water, and ethyl silicate in step (1) is 1:18.7:3.2:1.8;
the mass percentage of the ammonia in step (1) is 22%~25%;
the mass ratio of the ethyl silicate and the mixed liquid of ethyl silicate and octadecyltrimethoxysilane in step (1) is 1:1.5; and
the mass ratio of the ethyl silicate and octadecyltrimethoxysilane in the liquid mixture of the ethyl silicate and octadecyltrimethoxysilane in step (1) is 1:0.45.

3. The preparation method according to claim 1, wherein:
the mass ratio of said silica nanospheres and cyanamide in step (2) is 1:5.

4. The preparation method according to claim 1, wherein:
the ratio of graphite and concentrated sulfuric acid in step (3) is 1g: 23 mL;
the mass ratio of graphite and Potassium Permanganate in step (3) is 1:6; and
Potassium Permanganate is divided into two batches with the same mass in step (3).

5. The preparation method according to claim 1, wherein:
the ratio of said hollow graphitic carbon nitride nanosphere and 3-aminopropyltriethoxysilane in step (4) is 1 g: 3 mL; and
the concentration of the hollow graphitic carbon nitride nanosphere in said suspension in step (4) is 1 mg/mL.

6. The preparation method according to claim 1, wherein:
the mass ratio of said surface modified hollow graphitic carbon nitride nanospheres and the graphene oxide in step (5) is 1:0.1;
the concentration of surface modified hollow graphitic carbon nitride nanospheres in said suspension in step (5) is 1 mg/mL;
the concentration of graphene oxide in aqueous solution in step (5) is 0.1 mg/mL; and
the mass ratio of said graphene oxide and the hydrazine hydrate in step (5) is 1:1.

7. The preparation method according to claim 1, wherein:
the mass ratio of the composite and the polymer in step (6) is 1:20;
said polymer in step (6) is selected from any one of PAN, polyvinyl alcohol and polyvinylpyrrolidone;
the mass percentage of the polymer in dimethylformamide in step (6) is 10%; and
the conditions of said electrostatic spinning in step (6) are as follows: negative voltage-9 kV, positive voltage 18 kV, speed 0.2 mm/min.

\* \* \* \* \*